July 3, 1956

H. B. CHAPIN 2,753,053

HOSIERY DISPLAY DEVICE

Filed Jan. 22, 1953

INVENTOR.
HERBERT B. CHAPIN
BY
Parrott & Richards
ATTORNEYS

INVENTOR.
HERBERT B. CHAPIN
BY
Parrott & Richards
ATTORNEYS

July 3, 1956

H. B. CHAPIN 2,753,053

HOSIERY DISPLAY DEVICE

Filed Jan. 22, 1953

INVENTOR.
BY HERBERT B. CHAPIN
Parrott & Richards
ATTORNEYS

July 3, 1956
H. B. CHAPIN
2,753,053
HOSIERY DISPLAY DEVICE
Filed Jan. 22, 1953
4 Sheets-Sheet 4
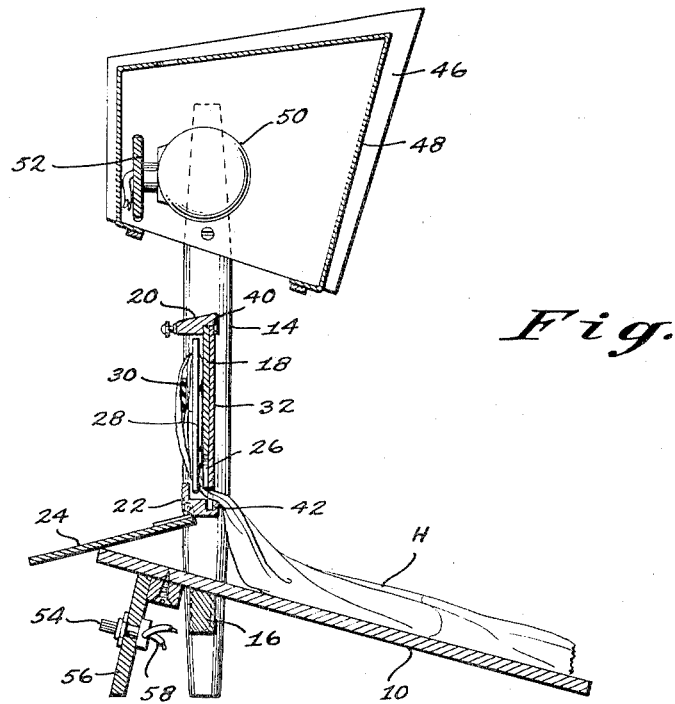
Fig. 5
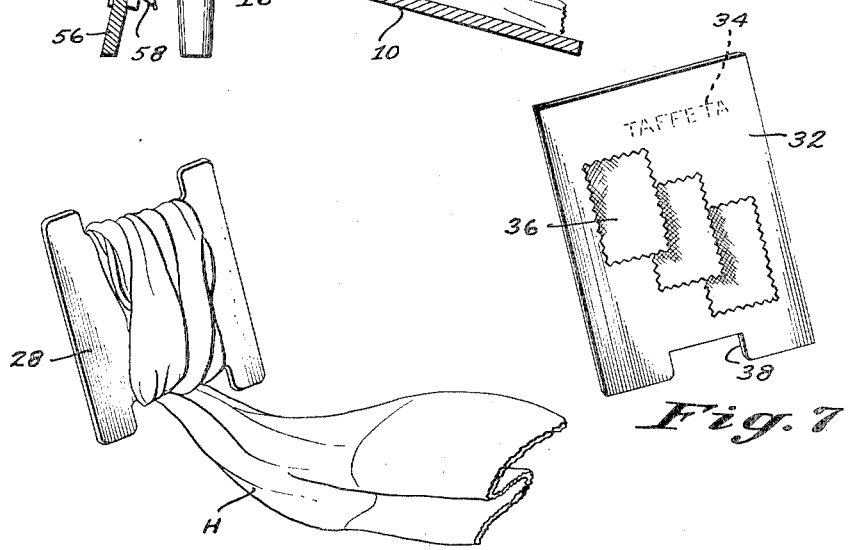
Fig. 6
Fig. 7
INVENTOR.
HERBERT B. CHAPIN
BY
Parrott & Richards
ATTORNEYS

United States Patent Office 2,753,053
Patented July 3, 1956

2,753,053

HOSIERY DISPLAY DEVICE

Herbert B. Chapin, Roslyn Heights, N. Y., assignor to Chadbourn Gotham, Inc., a corporation of North Carolina Application January 22, 1953, Serial No. 332,666

2 Claims. (Cl. 211—45)

This invention relates generally to display devices, and more particularly to a uniquely useful and effective device of this sort for displaying hosiery and the like.

This device of the present invention is adapted especially for the display of ladies hosiery and provides an exceptionally convenient means for displaying readily a complete color range of hosiery, for example, without any necessity for otherwise disturbing a merchandising stock.

Briefly described, the hosiery display device of the present invention comprises a compartment structure adapted to contain a plurality of wound hose with a portion of each hose extended from this compartment structure and arranged for examination in relation to any color identification or other indicia desired.

This arrangement and other features of a display device embodying the present invention are described in detail below in connection with the accompanying drawing, in which:

Fig. 5 is a vertical section taken substantially on the line 5—5 in Fig. 4;

Fig. 6 is a perspective view of one of the rack members showing a hose wound thereon; and Fig. 7 is a perspective view of an indicia plate such as is used according to the present invention.

Figure 1:
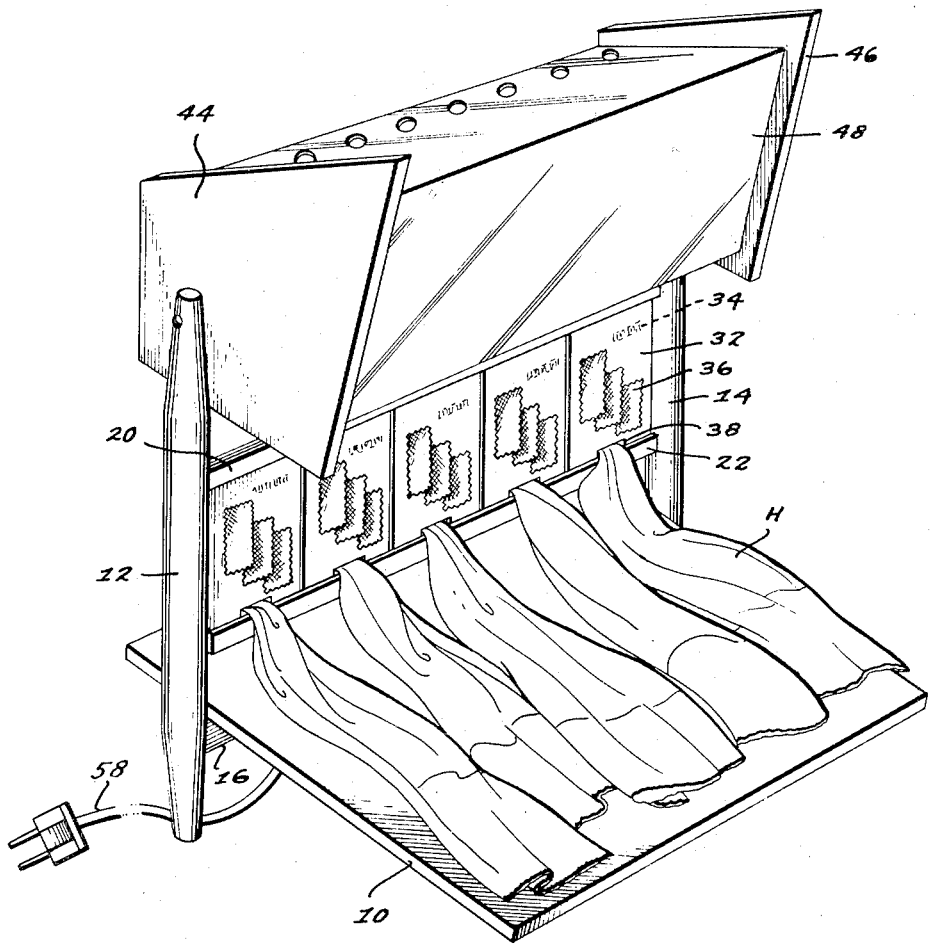
Fig. 1 is a perspective view of a display device constructed in accordance with the present invention.

The embodiment of the invention illustrated in Fig. 1 of the drawing comprises a display board 10 onto which portions of hose H are shown extended for display. This display board 10 will usually be most effectively positioned with an inclination, as shown, and it is made to assume the position desired by assembly with uprights 12 and 14 so as to form a standing structure, suitably by means of a cross brace member extended between the uprights 12 and 14 adjacent the rear edge of the display board 10, as at 16 (compare Fig. 5).

Figure 3:
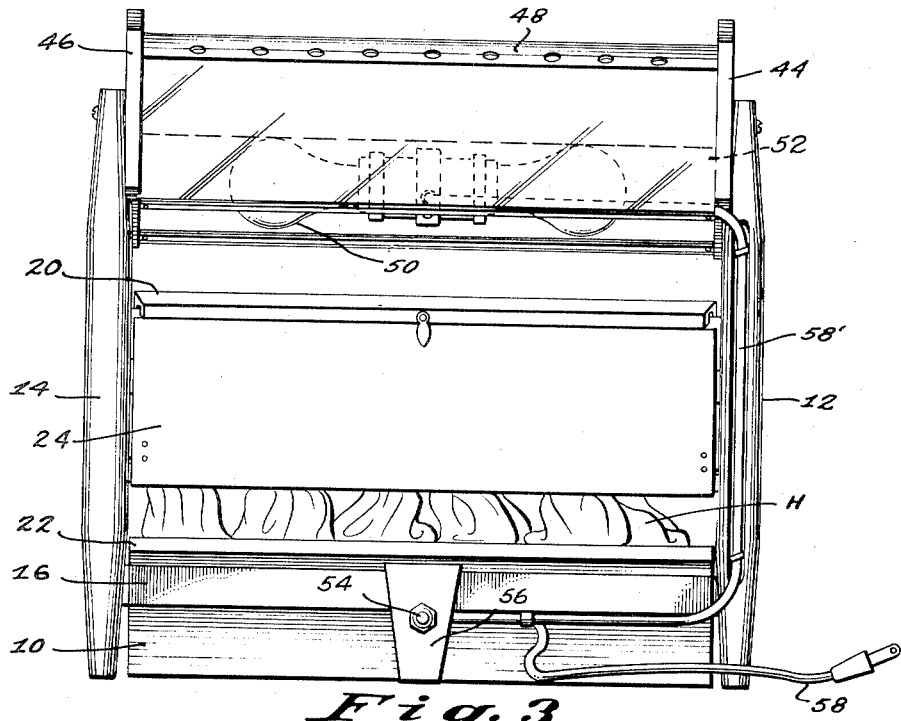
Fig. 3 is a rear elevation of the device shown in Figs. 1 and 2.

Above the display board 10 a compartment structure is formed between the uprights 12 and 14 by means of fixed front wall 18 and top 20 and bottom 22 members, together with a hinged back wall member 24 that is arranged for opening and closing to allow access to the compartment structure (compare Figs. 3 and 4 with Fig. 5), the uprights 12 and 14 forming the end walls of this structure.

Figure 2:
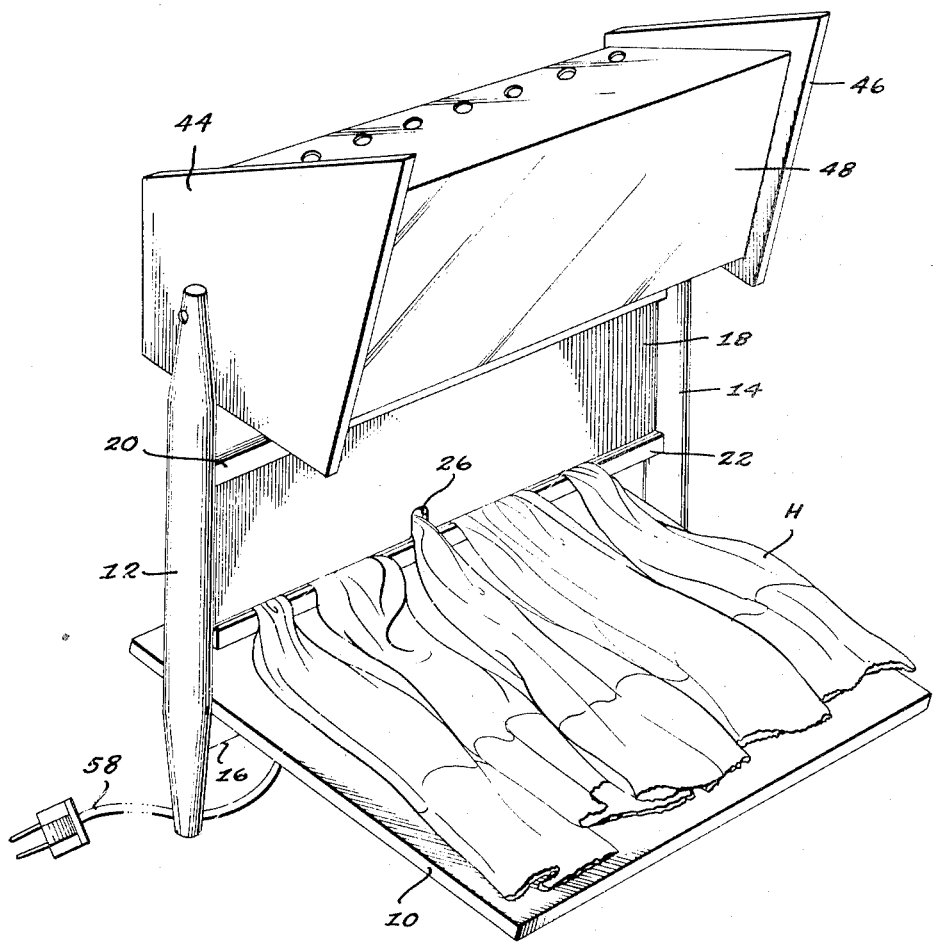
Fig. 2 is a corresponding perspective view showing the device with the indicia plates removed.

The front wall member 18 of this compartment structure is further specially arranged in that its bottom edge is spaced from the bottom member 22 so that portions of hose H contained in the compartment structure may be extended beneath this bottom edge onto the display board 10, as shown best in Fig. 2. Also, the front wall member 18 is preferably formed at its bottom edge with a notch 26 that is of substantial size but of relatively restricted width (compare Figs. 2, 4, and 5), so as to provide for readily threading the extending portions of the hose H through or under the front wall 18, after which they may be displaced laterally in extending relation beneath the bottom edge of front wall 18 for display arrangement as will be explained further presently.

Figure 4:
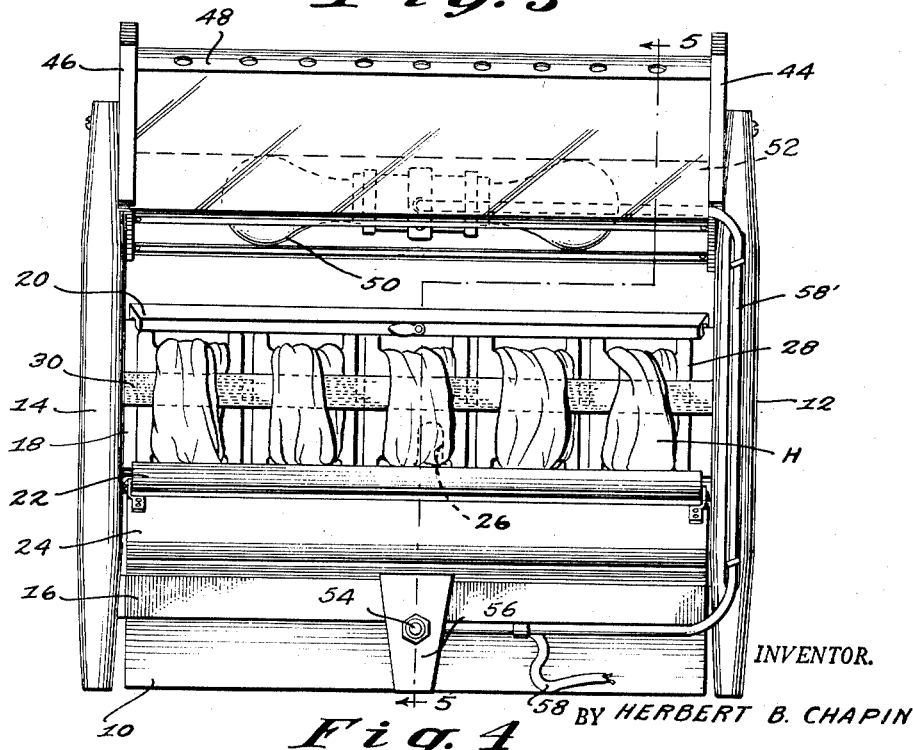
Fig. 4 is a corresponding rear elevation with the back wall member of the compartment structure in open position.

In order to arrange the hose H in the compartment structure for display in the manner indicated above, rack members 28 are provided on which the hose H may be wound with a portion extending therefrom for display (see Fig. 6). These rack members 28 are proportioned so that they may be removably disposed in the compartment structure to stand side by side on the bottom 22 in a height substantially coextensive with that of the front wall 18 and an aggregate width substantially equal to the length of the front wall 18. Accordingly, with the hinged back wall 24 open, as seen in Figs. 4 and 5, the rack members 28 may be removed from the compartment structure to have the hose H wound thereon as in Fig. 6 in any desired selection.

The rack members 28 carrying the hose H may then be replaced in the order desired, with the extending portion of the hose H being threaded first through the front wall notch 26, which allows adequate space for easy threading manipulation, and the extending hose portion H then being displaced laterally beneath the bottom edge of front wall 18 in accordance with the position of the related rack member 28 in the compartment structure. Provision may be made for holding the rack members 28 uprightly in the compartment structure as they are replaced with the hose H thereon by means of an elastic strip 30 or the like extended between the uprights 12 and 14 interiorly of the compartment structure. After replacement of all of the rack members 28 in this manner with the hose H arranged for display, the hinged back wall 24 may then be closed to contain the wound portions of the hose H.

The above described compartment structure is also arranged according to the present invention to accommodate a series of indicia plates 32 corresponding in number to the rack members 28 so as to provide for identification, as desired, of each hose H displayed. These indicia plates 32 suitably comprise display cards or like carrying descriptive matter as at 34, or complementary dress fabric samples as at 36, and they are formed at their bottom edges with a notch 38 of substantial width and of a depth substantially equal to the spacing of the bottom edge of front wall 18 above the compartment bottom 22, so as not to interfere with the extending disposition of the hose H beneath the front wall bottom edge. The indicia plates 32 are installed, as seen in Fig. 1, in covering relation at the exposed face of the compartment front wall 18, by engagement in slots provided in the compartment top and bottom members as at 40 and 42 in Fig. 5, so that the indicia plates 32 may be arranged in place readily in relation to the rack members 28 and hose H extending therefrom.

The previously described arrangement of the uprights 12 and 14 also allows them to serve as supports for an overhead illuminating means, if desired, such means being shown in the drawings as comprising end plates 44 and 46 attached at the upper ends of the uprights 12 and 14, and slotted to receive and contain therebetween a parchment shade housing 48 or the like for a suitable light source 50 carried on a crossbar 52 extended between the end plates 44 and 46. A control switch 54 for the light source 50 may conveniently be arranged on a bracket 56 mounted beneath the rear edge of the display board 10, with an electrical connection 58 running through the switch 54 up the back side of one of the uprights 12 as at 58' to the light source 50.

The present invention has been described in detail above for purposes of illustration only and is not intended to be limited by this description or otherwise except as defined in the appended claims.

I claim:

1. A display device for hoisery and the like comprising a compartment structure having fixed front, top and bottom, and end members, and having a hinged back member arranged for opening and closing to allow access to said compartment structure, the front member of said structure being spaced at its bottom edge from said bottom member and having a notch of substantial size but relatively restricted width formed in said bottom edge with said bottom edge extending laterally from said notch, a plurality of stationary rack members disposed in said compartment structure to stand on said bottom member in a height coextensive with that of said front member, whereby hosiery may be wound on said rack members and disposed in said compartment structure with an end threaded readily through said notch and displaced laterally in extending relation beneath said front member bottom edge for display.

2. A display device for hosiery as characterized in claim 1 and in which a plurality of indicia plates are removably installed in covering relation at the exposed face of said front member.

References Cited in the file of this patent

UNITED STATES PATENTS

| | | |
|---|---|---|
| D. 166,060 | Aron | Mar. 4, 1952 |
| 440,031 | Hering | Nov. 4, 1890 |
| 503,488 | Marten | Aug. 15, 1893 |
| 845,950 | Hart | Mar. 5, 1907 |
| 921,543 | Hayden | May 11, 1909 |
| 1,630,105 | Bernard | May 24, 1927 |
| 1,646,313 | Perry et al. | Oct. 18, 1927 |
| 1,674,939 | Altschul | June 26, 1928 |
| 1,987,159 | Rasmussen | Jan. 8, 1935 |